United States Patent
Zhang et al.

(10) Patent No.: US 10,477,592 B2
(45) Date of Patent: Nov. 12, 2019

(54) UL WAVEFORM DURING RACH PROCEDURE AND AUTONOMOUS UL TRANSMISSION

(71) Applicant: QUALCOMM Incorporated, San Diego, CA (US)

(72) Inventors: Xiaoxia Zhang, San Diego, CA (US); Tao Luo, San Diego, CA (US); Taesang Yoo, San Diego, CA (US); Juan Montojo, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/813,811

(22) Filed: Nov. 15, 2017

(65) Prior Publication Data

US 2018/0139785 A1    May 17, 2018

Related U.S. Application Data

(60) Provisional application No. 62/422,801, filed on Nov. 16, 2016.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0007* (2013.01); *H04L 5/0048* (2013.01);
(Continued)

(58) Field of Classification Search
CPC ......... H04W 74/0833; H04W 72/0413; H04W 88/02; H04L 5/0007; H04L 5/0048
See application file for complete search history.

(56) References Cited

U.S. PATENT DOCUMENTS 8,462,712 B2   6/2013  Yamada et al.
9,692,550 B2 * 6/2017  Bayesteh .............. H04L 1/0001
(Continued)

FOREIGN PATENT DOCUMENTS

WO   WO-2010030941 A2   3/2010
WO   WO-2016168024 A1   10/2016
WO   WO-2016171765 A1   10/2016

OTHER PUBLICATIONS

AT&T: "Network Assisted Waveform Selection for NR", 3GPP TSG-RAN WG1 #86bis, R1-1609384, 8.1.1.1, Lisbon, Portugal, 10th-14th Oct. 2016, pp. 1-3.
Intel Corporation: "Considerations on Waveform Selection for New Radio Interface", 3GPP TSG RAN WG1 Meeting #84bis, R1-162384, 8.1.4.1, Busan, South Korea, 11th-15th Apr. 2016, pp. 1-5.
(Continued)

*Primary Examiner* — Christine Ng
(74) *Attorney, Agent, or Firm* — Qualcomm/Norton Rose Fulbright US LLP

(57) ABSTRACT

Systems and methods herein determine whether an uplink RACH request and/or an uplink autonomous message will be sent using Discrete Fourier Transform-Spread-Orthogonal Frequency Division Multiplexing (DFT-S-OFDM), Cyclic Prefix Orthogonal Frequency Division Multiplexing (CP-OFDM), or another waveform. The determinations may be based on carrier frequencies, path loss measurements, preconfigurations, and/or more. Further, the systems and methods may send the uplink using time and/or frequency resources that correspond to the DFT-S-OFMD waveform, CP-OFDM waveform, or other waveform. Other aspects, embodiments, and features are also claimed and described.

24 Claims, 8 Drawing Sheets

(51) Int. Cl.
*H04W 72/04* (2009.01)
*H04L 27/00* (2006.01)
*H04W 88/02* (2009.01)

(52) U.S. Cl.
CPC ..... *H04L 27/0008* (2013.01); *H04W 72/0413* (2013.01); *H04L 5/0053* (2013.01); *H04W 88/02* (2013.01)

(56) References Cited

U.S. PATENT DOCUMENTS

| | | | | |
|---|---|---|---|---|
| 2008/0025254 | A1* | 1/2008 | Love | H04W 52/242 370/329 |
| 2008/0318608 | A1* | 12/2008 | Inoue | H04B 1/707 455/509 |
| 2010/0067591 | A1 | 3/2010 | Luo et al. | |
| 2010/0091919 | A1 | 4/2010 | Xu et al. | |
| 2014/0128062 | A1* | 5/2014 | Batchu | H04W 4/70 455/435.1 |
| 2015/0181589 | A1* | 6/2015 | Luo | H04B 7/0452 370/329 |
| 2016/0036608 | A1* | 2/2016 | Lee | H04L 12/40 375/295 |
| 2017/0019930 | A1* | 1/2017 | Lee | H04W 74/0833 |
| 2017/0311296 | A1* | 10/2017 | Onggosanusi | H04B 7/0456 |
| 2017/0331608 | A1 | 11/2017 | Luo et al. | |

OTHER PUBLICATIONS

<span style="font-family: calibri;">LG Electronics: "Discussion on DFT-s-OFDM and CP-OFDM for Uplink", 3GPP TSG RAN WG1 Meeting #86bis, R1-1609222, 8.1.1.1, Lisbon, Portugal, 10th-14th Oct. 2016, pp. 1-10.
CATT: "NR RACH Procedure", 3GPP Draft; R1-1611375, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016 (Nov. 13, 2016), XP051175356, Retrieved from the Internet: URL:http://www.3gpp.org/ftp/Meetings_3GPP_SYNC/RAN1/Docs/ [retrieved on Nov. 13, 2016], 4 pages.
Partial International Search Report—PCT/US2017/062081—ISA/EPO—dated Feb. 21, 2018.
Qualcomm Incorporated: "UL Waveform Configuration", 3GPP Draft; R1-1612075, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 13, 2016, XP051176035, Retrieved from the Internet: URL:http://www.3gpp.org/ftp/Meetings_3GPP_SYNC/RAN1/Docs/ [retrieved on Nov. 13, 2016], 6 pages.
International Search Report and Written Opinion—PCT/US2017/062081—ISA/EPO—dated Jun. 5, 2018.

\* cited by examiner

UL WAVEFORM DURING RACH PROCEDURE AND AUTONOMOUS UL TRANSMISSION

CROSS-REFERENCE TO RELATED APPLICATIONS

This application claims the benefit of U.S. Provisional Patent Application No. 62/422,801, entitled, "UL WAVEFORM DURING RACH PROCEDURE AND AUTONOMOUS UL TRANSMISSION," filed on Nov. 16, 2016, the disclosure of which is hereby incorporated by reference herein in its entirety as if fully set forth below and for all applicable purposes.

TECHNICAL FIELD

Aspects of the present disclosure relate generally to wireless communication systems, and more particularly, to waveform selection in wireless communications initiated by a user device. Certain embodiments of the technology discussed below can implement waveform selection, such as to provide selection between DFT-S-OFDM waveforms or CP-OFDM waveforms for communication signals for wireless communication devices, systems, and methods.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs (eNBs) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

To improve throughput and increase the amount of data being transferred, UEs are equipped to operate using various waveforms, for example Discrete Fourier Transform-Spread-Orthogonal Frequency Division Multiplexing (DFT-S-OFDM) waveforms, Cyclic Prefix Orthogonal Frequency Division Multiplexing (CP-OFDM) waveforms, and/or other waveforms. Because UEs are capable of transmitting using one of many different waveforms, it would be desirable to have a way to select which waveform a UE will use when initiating a RACH procedure and/or when sending an autonomous UL transmission. Systems and methods herein enable and provide communication devices (e.g., UEs or components within device) that can determine which waveform to use for communications. For example, this can occur when initiating a RACH procedure and/or when sending an autonomous UL transmission.

In one aspect of the disclosure, a method comprises selecting, by a user equipment (UE), a waveform selected from one of Discrete Fourier Transform-Spread-Orthogonal Frequency Division Multiplexing (DFT-S-OFDM), and Cyclic Prefix Orthogonal Frequency Division Multiplexing (CP-OFDM). The method further comprises determining time and frequency resources that correspond to the selected waveform; and sending an uplink (UL) transmission according to the selected waveform and the determined time and frequency resources.

In embodiments, a method may comprise measuring, by the UE, a path loss, performing the selecting the waveform at least on the measured path loss. Further, in embodiments, the methods may comprise identifying, by the UE, that the UE is preconfigured to send RACH requests and/or autonomous UL transmissions according to DFT-S-OFDM and/or CP-OFDM, and performing the selecting based at least on the preconfiguration.

According to example embodiments, the UL transmission of methods may be a 2-step RACH message or a 4-step RACH message from time to time and the selected waveform of the UL transmission may be indicated in at least one of: a DMRS and a preamble plus. In embodiments, the UL transmission of methods may be autonomous UL transmissions and a control signal indicating the selected waveform may be sent with the autonomous UL transmission.

In other aspects of the disclosure, a user equipment (UE) comprises one or more processor that selects a waveform from one of Discrete Fourier Transform-Spread-Orthogonal Frequency Division Multiplexing (DFT-S-OFDM), and Cyclic Prefix Orthogonal Frequency Division Multiplexing (CP-OFDM). The one or more processor may further determine time and frequency resources that correspond to the selected waveform. Moreover, the UE may further include one or more transmitter that sends an UL transmission, via one or more antenna, according to the selected waveform and the determined time and frequency resources.

In embodiments, the one or more processor further measure a path loss and selects the waveform based at least on the measured path loss. Further still, in embodiments, the one or more processor further identifies that that the UE is preconfigured to send RACH requests and/or autonomous UL transmissions according to DFT-S-OFDM and/or CP- OFDM, and the one or more processor may perform the selecting based at least on the preconfiguration.

According to example embodiments, the UL transmission of UEs may be a 2-step RACH message or a 4-step RACH message from time to time and the selected waveform of the UL transmission may be indicated in at least one of: a DMRS and a preamble plus. In embodiments, the UL transmission of UEs may be autonomous UL transmissions and a control signal indicating the selected waveform may be sent with the autonomous UL transmission.

In additional aspects of the disclosure, a non-transitory computer-readable medium having program code recorded thereon, which when executed on user equipment (UE) causes the UE to perform functions. The example the program code comprises program code for selecting a waveform to use for RACH requests or autonomous UL transmissions and program code for receiving time and frequency resources from a base station. Moreover, based on the received time and frequency resources, program code comprises program code for determining which of the time and frequency resources correspond to the preconfigured waveform, wherein the preconfigured waveform is one of Discrete Fourier Transform-Spread-Orthogonal Frequency Division Multiplexing (DFT-S-OFDM), and Cyclic Prefix Orthogonal Frequency Division Multiplexing (CP-OFDM). Further still, the program code may comprise program code for sending an UL transmission according to the determined waveform and the determined time and frequency resources that correspond thereto.

In embodiments, the program code may comprise program code for measuring, by the UE, a path loss, and program code for performing the selecting the waveform at least on the measured path loss. Further, in embodiments, the program code may comprise program code for identifying, by the UE, that the UE is preconfigured to send RACH requests and/or autonomous UL transmissions according to DFT-S-OFDM and/or CP-OFDM, and program code for performing the selecting based at least on the preconfiguration.

According to example embodiments, the UL transmission may be a 2-step RACH message or a 4-step RACH message from time to time and the selected waveform of the UL transmission may be indicated in at least one of: a DMRS and a preamble plus. In embodiments, the UL transmission may be autonomous UL transmissions and a control signal indicating the selected waveform may be sent with the autonomous UL transmission. Other aspects, features, and embodiments of the present invention will become apparent to those of ordinary skill in the art, upon reviewing the following description of specific, exemplary embodiments of the present invention in conjunction with the accompanying figures.

In more aspects of the disclosure, a system comprises means for selecting a waveform selected from one of Discrete Fourier Transform-Spread-Orthogonal Frequency Division Multiplexing (DFT-S-OFDM), and Cyclic Prefix Orthogonal Frequency Division Multiplexing (CP-OFDM). The system may further comprises means for determining time and frequency resources that correspond to the selected waveform; and means for sending an uplink (UL) transmission according to the selected waveform and the determined time and frequency resources.

In embodiments, the system may comprise means for measuring a path loss, and means for performing the selecting the waveform at least on the measured path loss. Further, in embodiments, the system may comprise means for identifying that the UE is preconfigured to send RACH requests and/or autonomous UL transmissions according to DFT-S-OFDM and/or CP-OFDM, and performing the selecting based at least on the preconfiguration.

According to example embodiments, the UL transmission of systems may be a 2-step RACH message or a 4-step RACH message from time to time and the selected waveform of the UL transmission may be indicated in at least one of: a DMRS and a preamble plus. In embodiments, the UL transmission of systems may be autonomous UL transmissions and a control signal indicating the selected waveform may be sent with the autonomous UL transmission.

Aspects of the technology may also include additional features. For example, in some arrangements, a waveform for a RACH message 3 can be DFT-S-OFDM or CP-OFDM. Other aspects can include network components that signal directly or indirectly RACH message 3 waveform to UEs. This can include network signals waveforms for RACH message 3 in remaining minimum system information (SI) as one bit. Further, the waveform selection (message 3) can be positioned in a UL transmission for RACH procedure. Selections between multi-step RACH procedures can be based on a number of factors including: (a) whether it is band dependent, licensed/unlicensed/shared spectrum; (b) path loss data; (c) presence of DMRS (e.g., to indicate a waveform for Msg1 (message based)); and/or (d) UE requests (e.g., based on UL waveform selection after RACH).

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
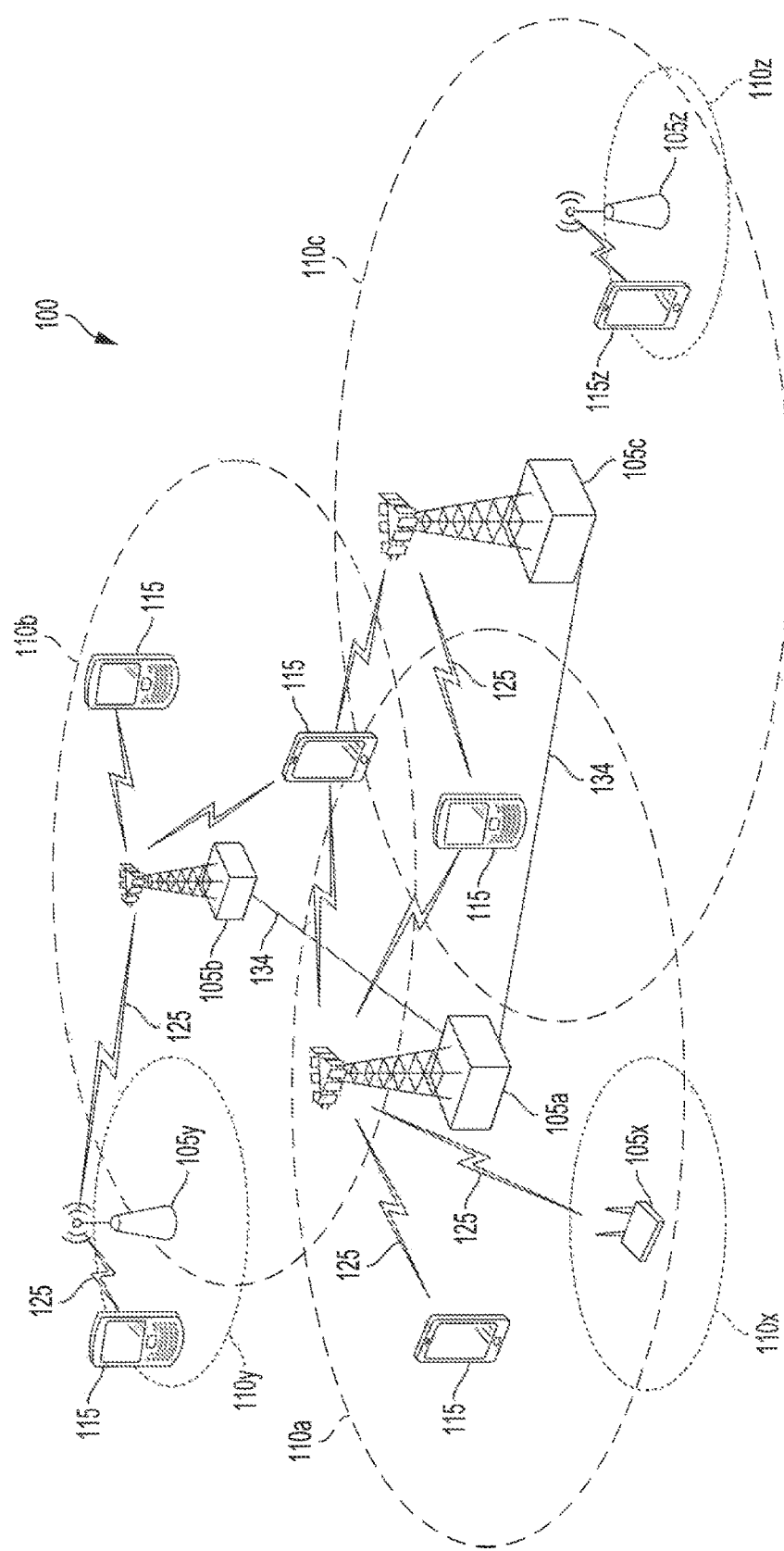
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc.

Moreover in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation networks. As appreciated by those skilled in the art, components appearing in FIG. 1 are likely to have related counterparts in other network arrangements.

Turning back to FIG. 1 wireless network 100 includes a number of base stations, such as may comprise evolved node Bs (eNBs), referred to herein as eNBs 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used. In implementations of wireless network 100 herein, eNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105a, 105b and 105c are macro eNBs for the macro cells 110a, 110b and 110c, respectively. eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
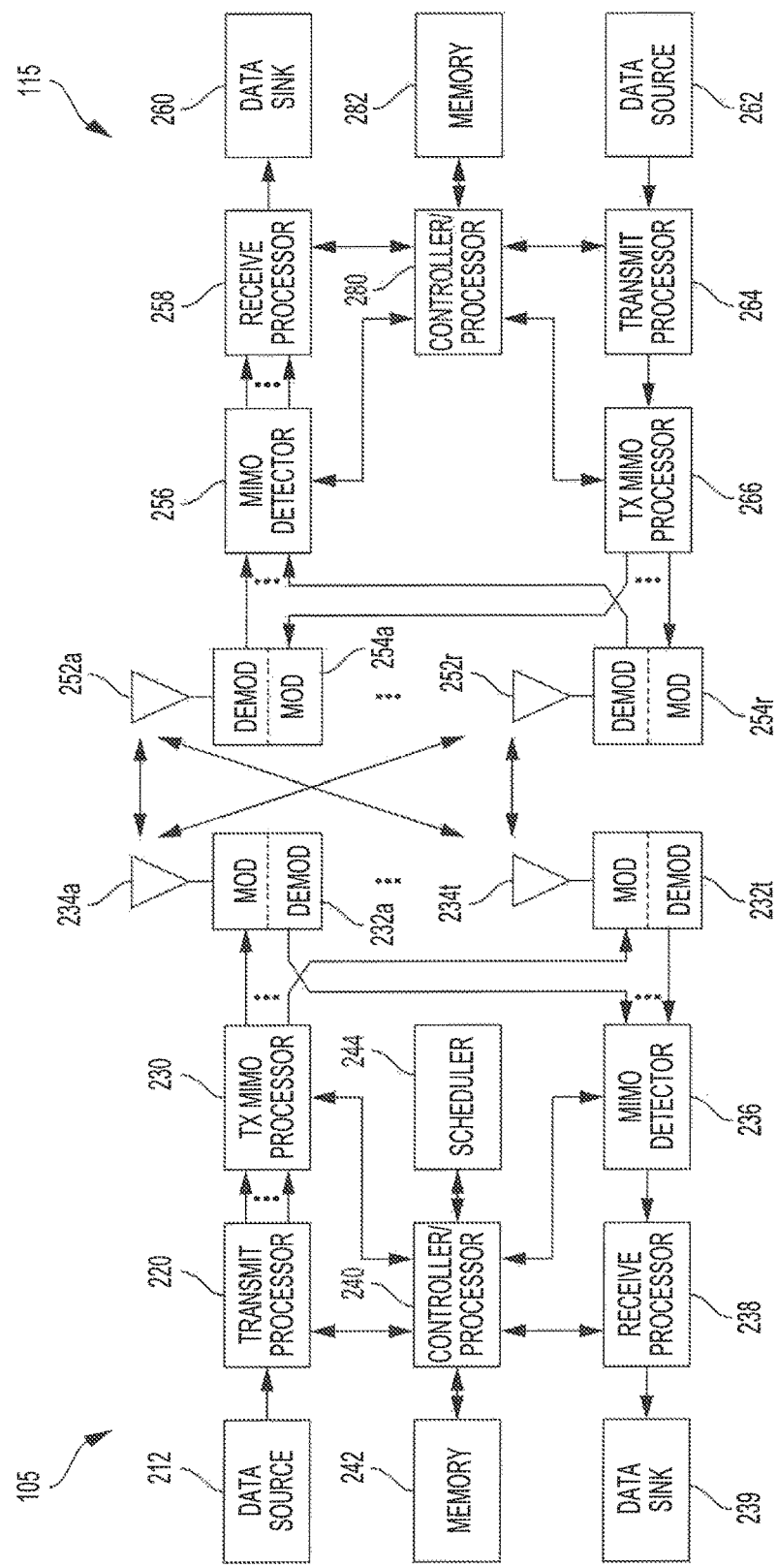
FIG. 2 is a block diagram conceptually illustrating a design of a base station (eNB) and a UE configured according to some embodiments of the present disclosure.

FIG. 2 shows a block diagram of a design of base station/eNB 105 and UE 115, which may be one of the base stations/eNBs and one of the UEs in FIG. 1. For a restricted association scenario, the eNB 105 may be small cell eNB 105z in FIG. 1, and UE 115 may be UE 115z, which in order to access small cell eNB 105z, would be included in a list of accessible UEs for small cell eNB 105z. eNB 105 may also be a base station of some other type. eNB 105 may be equipped with antennas 234a through 234t, and UE 115 may be equipped with antennas 252a through 252r.

At eNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from eNB 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to eNB 105. At eNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 may perform or direct the execution of various processes for the techniques described herein. Controllers/processor 280 and/or other processors and modules at UE 115 may also perform or direct the execution illustrated in FIGS. 3A-6, and/or other processes for the techniques described herein. Memories 242 and 282 may store data and program codes for eNB 105 and UE 115, respectively. Scheduler 244 may schedule UEs for data transmission on the downlink and/or uplink.

UL Waveform and RACH Procedure During Initial Access

When a UE initially accesses an eNB, a random access procedure (e.g., a random access procedure for a random access channel (RACH), such as the RACH channel specified in LTE), may be performed. The RACH procedure may be a multi-step procedure or have multiple stages. For example, a RACH procedure may be a 2-step RACH procedure, a 4-step RACH procedure, or another RACH procedure configuration. Further, the RACH procedure may be performed using one of multiple waveforms (e.g., CP-OFDM, DFT-S-OFDM, or another waveform). Cyclic Prefixed based Orthogonal Frequency Divisional Multiplexing (CP-OFDM) waveforms may be used for a single-stream transmission and/or multi-stream (e.g., MIMO) transmissions, while Discrete Fourier Transform Spread Orthogonal Frequency Divisional Multiplexing (DFT-S-OFDM) waveforms may be limited to single stream transmissions (e.g., link budget limited cases). Because the RACH process may be performed using one of multiple waveforms, it would be helpful to establish processes for selecting which waveform of multiple waveforms will be used in the RACH process. Several advantageous ways to select a waveform for initial access are detailed below.

Figure 3A:
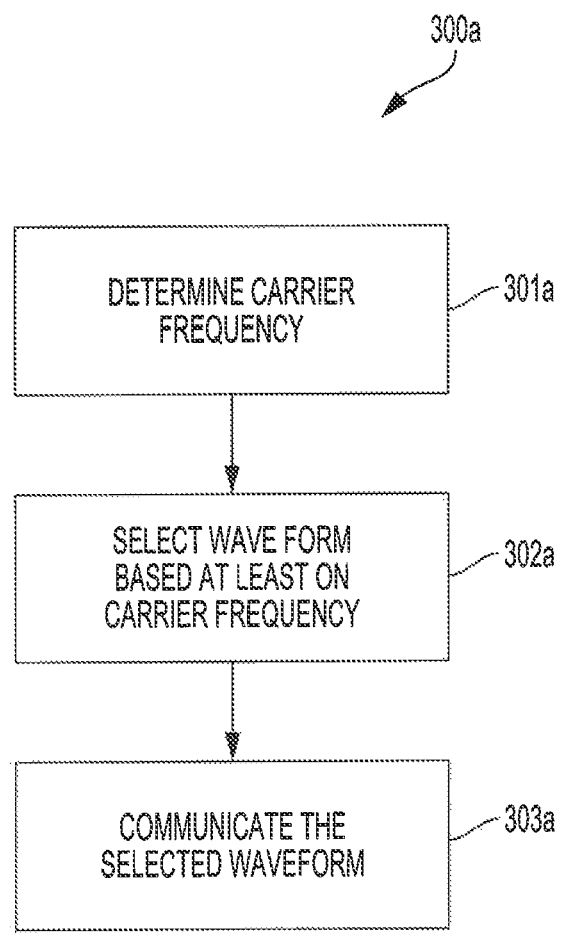
FIG. 3A is a flow diagram showing operations in accordance with some embodiments of the present disclosure.

FIG. 3A shows an example embodiment, wherein the waveform is selected by the eNB. The processes of flow 300*a* may, for example, be implemented by waveform selection logic of eNB 105 and/or UE 115 (e.g., logic of controller/processor 240 and/or controller/processor 280). In process 300*a*, the eNB may select from a DFT-S-OFDM waveform, CP-OFDM waveform, and/or any other waveform compatible with the eNB. The eNB may base the selection at least on the carrier frequency. In step 301*a*, the eNB determines the carrier frequency of the deployment. In embodiments, the eNB may base the selection of the waveform on additional information. For example, the selection may be further based on factors such as whether the network is licensed and/or unlicensed, the type of access (e.g., shared access type), and/or the deployment scenario (e.g., macro, small cell, etc.) on that carrier frequency. As such, in step 301*a* the eNB may determine additional information, such as the factors described above. In step 302*a*, the eNB selects a waveform based at least on the determined carrier frequency and in some embodiments, further based on additional factors. In step 303*a*, the eNB communicates the selected waveform. For example, the eNB communicates the selected waveform by broadcasting the selected waveform. The broadcast may or may not include other configuration data as well. In embodiments, a UE receives the broadcasted waveform and uses the broadcasted waveform when initiating a RACH procedure. Process 300*a* may be used in a 2-step RACH process, a 4-step RACH process, and/or more.

Figure 3B:
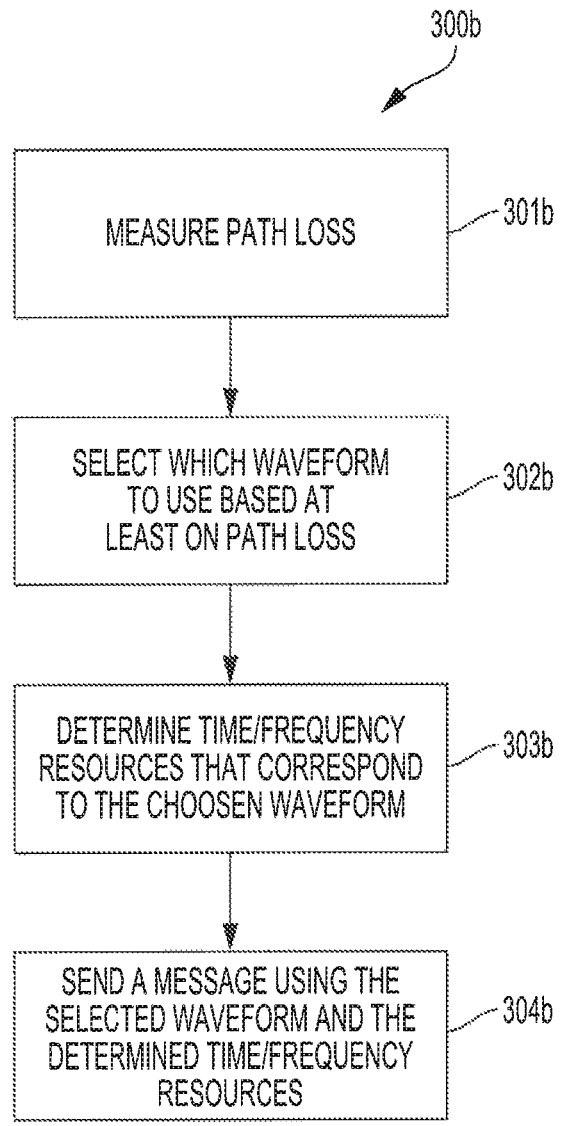
FIG. 3B is another flow diagram showing operations in accordance with some additional embodiments of the present disclosure.

FIG. 3B shows another example embodiment, wherein the waveform is selected by a UE. The processes of flow 300*b* may, for example, be implemented by waveform selection logic of eNB 105 and/or UE 115 (e.g., logic of controller/processor 240 and/or controller/processor 280). In process 300*b*, an eNB may statically or semi-statically configure the time resources and/or frequency resources. The eNB may configure different time resources and/or frequency resources for the different waveforms. For example, the eNB may configure first time resources and/or frequency resources for DFT-S-OFDM and second time resources and/or frequency resources for CP-OFDM. If another waveform is available, the eNB may configure still additional and different time resources and/or frequency resources for the other waveform. Further, in embodiments, the configured time resources and/or frequency resources may be the same regardless the waveform. Once configured, eNB communicates the configured time resources and/or frequency resources. In embodiments, the eNB communicates the time resources and/or frequency resources by broadcasting the time resources and/or frequency resources. The broadcast may or may not include other configuration data as well.

In step 301b, the UE measures and or otherwise determines the path loss from eNB to UE In step 302h, the UE selects a waveform based at least on the determined path loss. In embodiments, the UE may select from a DFT-S-OFDM waveform, CP-OFDM waveform, and/or any other waveform compatible with the UE. In step 303b, the UE determines which time resources and/or frequency resources correspond to the selected waveform. In step 304b, the UE sends a message using the selected waveform and the time resources and/or frequency resources that correspond to the selected waveform. Process 300b may be used in a 2-step RACH process, a 4-step RACH process, and/or more.

Figure 3C:
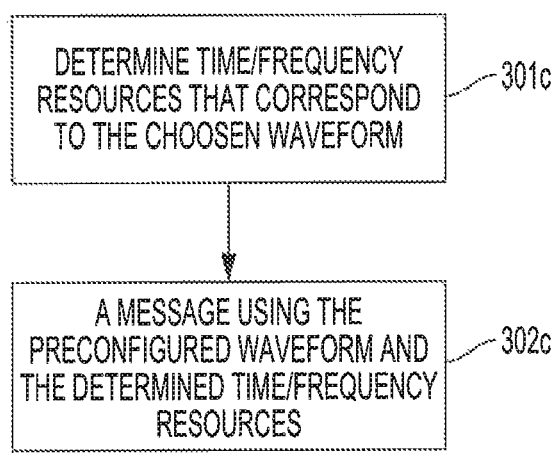
FIG. 3C is another flow diagram showing operations in accordance with some additional embodiments of the present disclosure.

In another embodiment, shown in FIG. 3C, the UE may be preconfigured to initiate the initial access according to a certain waveform. The processes of flow 300c may, for example, be implemented by waveform selection logic of eNB 105 and/or UE 115 (e.g., logic of controller/processor 240 and/or controller/processor 280). In embodiments, the UE may be preconfigured to always initiate its initial access using a DFT-S-OFDM waveform. Alternatively, the UE may be preconfigured to initiate its initial access using a CP-OFDM waveform. Alternatively still, the UE may be preconfigured to initiate its initial access using another waveform. In embodiments wherein the UE is preconfigured as described above, at step 301c, the UE determines which time resources and/or frequency resources correspond to the preconfigured waveform. Thereafter, in step 302c, the UE sends a message using the preconfigured waveform and the time resources and/or frequency resources that correspond to the preconfigured waveform. This preconfigured embodiment may be used in a 2-step RACH process, a 4-step RACH process, and/or more.

Figure 4:
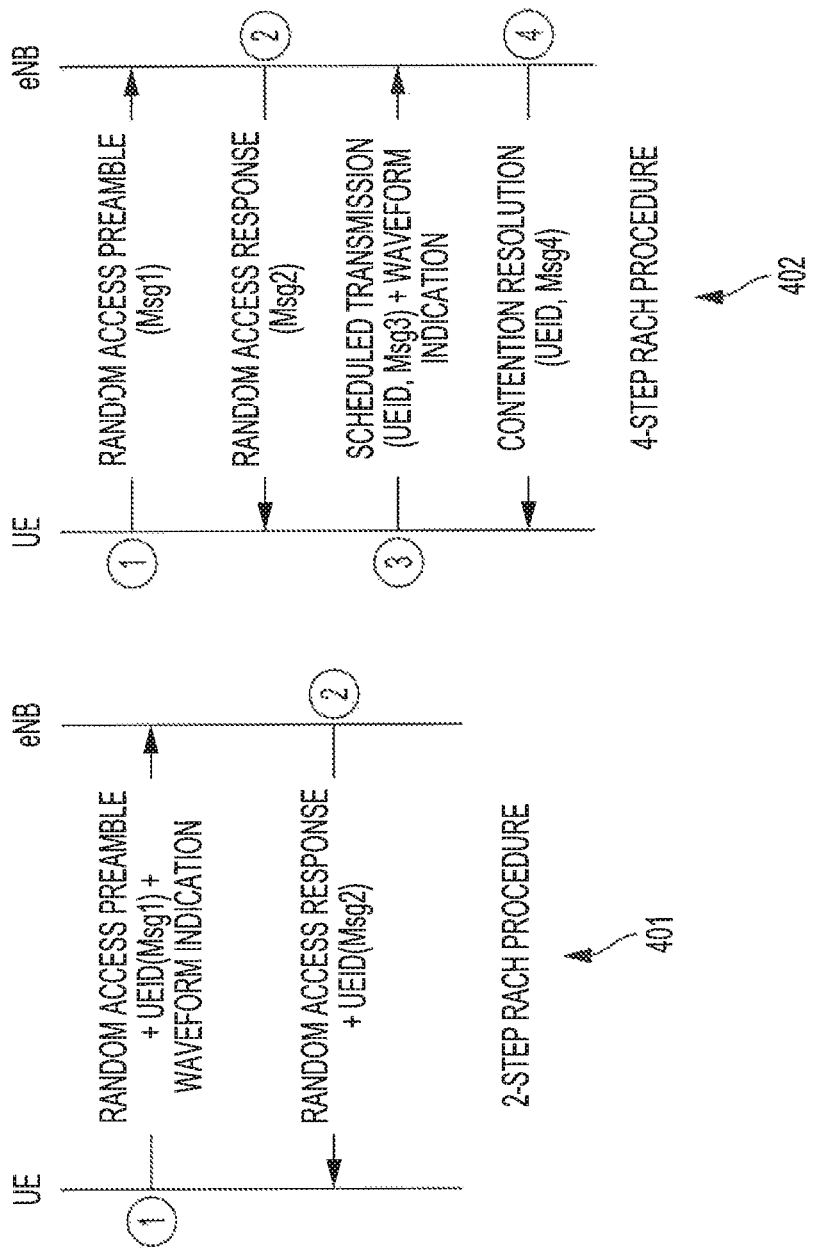
FIG. 4 illustrates an example 2-step RACH process and an example 4-step RACH process

In embodiments wherein the UE selects the waveform or is preconfigured with the waveform, the UE may indicate the waveform to the eNB. In embodiments wherein the waveform is preconfigured, the UE may not inform the eNB of the waveform. FIG. 4 shows examples of a 2-step RACH process and a 4-step RACH process which indicate the waveform to the eNB.

In a 2-step process, the waveform of the present message and the waveform for subsequent UL transmissions are indicated in the first message (e.g., msg1). In embodiments, the preamble of the first message (e.g., msg1) may include the first waveform indicator (e.g., indicating the waveform of the present message). Such a preamble may be called a preamble plus. In other embodiments, the Demodulation Reference Signal (DMRS) of the first message (e.g., msg1) may include the first waveform indication. Further, a second waveform indicator (e.g., indicating the waveform of subsequent UL transmissions) may be included within the data payload message of the first message (e.g., msg1). In a 2-step RACH procedure, UE 115 may transmit a message (msg1) to eNB 105 and UE 115 may receive a response (msg2) from eNR 105.

In a 2-step process, the preamble of the first message (e.g., msg1) may include the first waveform indicator (e.g., indicating the waveform of the present message). Such a preamble may be called a preamble plus. In other embodiments, the Demodulation Reference Signal (DMRS) of the first message (e.g., msg1) may include the first waveform indication. Same design can be applied to the message 3 with 4-step RACH procedure, With the 4-step RACH procedure, in contrast to the 2-step method, the second waveform indicator (e.g., indicating the waveform of subsequent UL transmissions) may be included within the data payload message of the third message (e.g., msg3). In a 4-step RACH procedure, UE 115 may transmit a first message (msg1) having the first waveform indicator to eNB 105, UE 115 may receive a response (msg2) from eNB 105, UE 115 then may transmit a third message (msg3) having the second waveform indicator to eNB 105, and thereafter UE 115 may receive a fourth message (msg4) from eNB 105 to complete the RACH procedure. In embodiments, a RACH process having more or less steps may be used, and the waveform may be indicated in any of the messages of a RACH process.

In any of the embodiments, a UE may indicate a waveform preference for subsequent UL transmissions. For example, the UE may measure the path loss and indicate the preferred waveform for subsequent UL transmissions based on the path loss measurement. As detailed above, the preferred waveform could be indicated in the first message (e.g., msg1) of a 2-step RACH process. Further, the preferred waveform could be indicated in the third message (e.g., msg3) of a 4-step RACH process.

UL Waveform with Autonomous UL Transmission

From time to time, the UE may desire to send an autonomous UL transmission. When sending an autonomous UL transmission, it is preferable for the UE to know which waveform to use for the autonomous UL transmission. There are several ways for the waveform of the autonomous UL transmission to be determined and/or defined.

In embodiments, the eNB may configure the waveform and the time and/or frequency resources for autonomous UL transmissions. This configuration may be static or semi-static. For example, the eNB may configure DFT-S-OFDM for autonomous UL transmission. DFT-S-OFDM may be preferable when the eNB does not have an up-to-date power headroom report and/or Sounding Reference Signal (SRS) transmission from UE. In embodiments, the eNB may configure CP-OFDM or another waveform for autonomous UL transmissions. When the eNB configures the waveform and the time and/or frequency resource for autonomous UL transmissions, the UE sends autonomous UL transmissions using the eNB configured waveform and its corresponding time and/or frequency resources. In this embodiments, the UE may send a control channel to indicate the up-to-date MCS.

Figure 5:
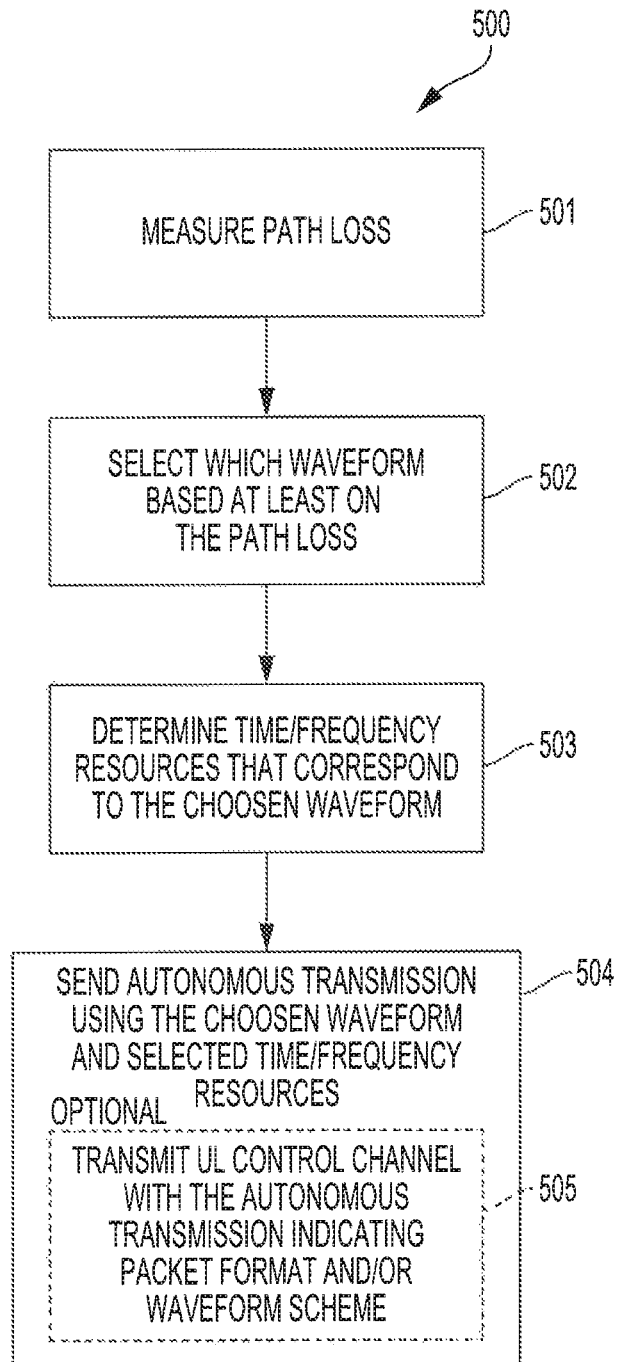
FIG. 5 is another flow diagram showing operations in accordance with some additional embodiments of the present disclosure.

In embodiments, the UE may select which waveform to use for autonomous UL transmission. FIG. 5 shows an example process 500, wherein the UE selects the waveform. The processes of flow 500 may, for example, be implemented by waveform selection logic of eNB 105 and/or UE 115 (e.g., logic of controller/processor 240 and/or controller/processor 280). In step 501, the UE measures and or otherwise determines the path loss from eNB to UE. In step 502, the UE selects a waveform based at least on the determined path loss. In embodiments, the UE may select from a DFT-S-OFDM waveform, CP-OFDM waveform, and/or any other waveform compatible with the UE. In step 503, the UE determines which time resources and/or frequency resources correspond to the selected waveform. In this example, the eNB may have statically or semi-statically configured the time resources and/or frequency resources. The eNB may configure different time resources and/or frequency resources (which can be overlapped) for DFT-S-OFDM, CP-OFDM, and/or another waveform, respectively. This overlapping may be used to conserve resources, and in embodiments may cause the eNB to perform blind detection. Once configured, eNB communicates the configured time resources and/or frequency resources. In embodiments, the eNB communicates the time resources and/or frequency resources by broadcasting the time resources and/or frequency resources. The broadcast may or may not include other configuration data as well.

In step 504, the UE sends the autonomous UL transmission using the UE selected waveform and the time resources and/or frequency resources that correspond to the selected waveform. In some circumstances, the eNB may not have up-to-date Modulation and Coding Scheme (MCS) and/or power headroom information for UE. As such, in optional step 505, the UE may transmit a UL control channel with the autonomous UL transmission indicating the packet format (e.g., MCS, etc.) and/or the waveform scheme the UE selected.

Figure 6:
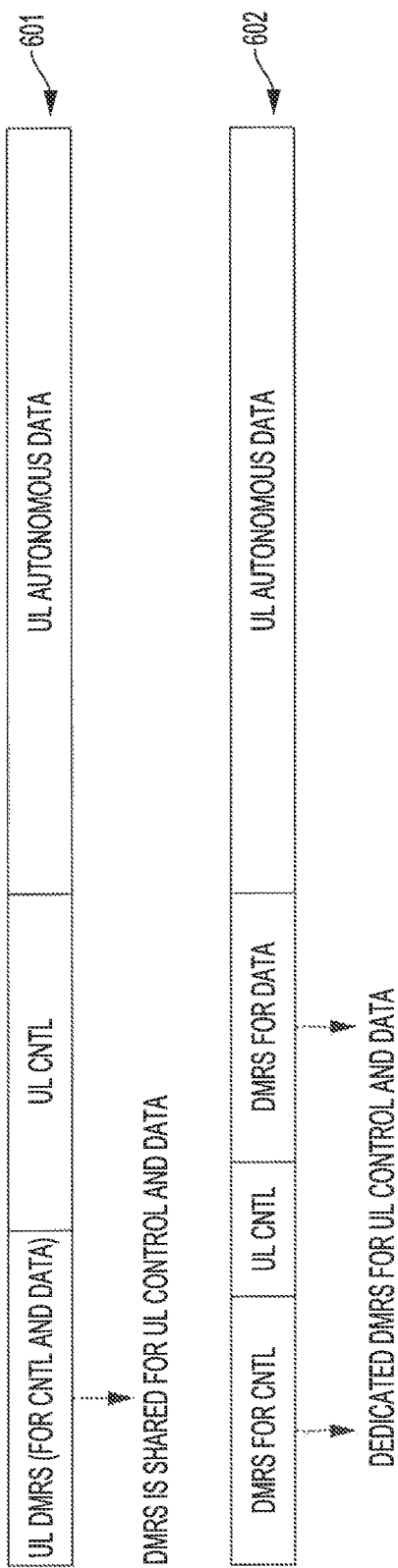
FIG. 6 illustrates example data frames according to embodiments of the present disclosure.

FIG. 6 shows some examples of control channels being transmitted from the UE along with data which indicates the waveform scheme and the packet format used by UE. In example 601, the packet has a shared DMRS, wherein the DMRS provides information for the UL control and for the data. Alternative example 602 has a dedicated DMRS for the control channel. In 602, the packet has a DMRS for the UL control and a separate DMRS for the data. The dedicated DMRS for the control channel may be used to maximize the antenna power utilization when multilayer transmission is used for data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3A-3C and FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, R, and/or C, the composition can contain A alone; B alone; C alone; A and R in combination; A and C in combination; R and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
   selecting, by a user equipment (UE), a waveform selected from one of:
      Discrete Fourier Transform-Spread-Orthogonal Frequency Division Multiplexing (DFT-S-OFDM) single-stream transmission waveform, and
      Cyclic Prefix Orthogonal Frequency Division Multiplexing (CP-OFDM) multi-stream transmission waveform;
   determining time and frequency resources that correspond to the selected waveform; and
   sending, by a transmit processor via one or more antennas, an uplink (UL) transmission according to the selected waveform and the determined time and frequency resources, wherein the UL transmission is part of a Random Access Channel (RACH) request, wherein the RACH request is one of:
      a 2-step RACH request including a first message and at least one subsequent UL transmission, and wherein a data payload of the first message of the 2-step RACH request includes:
         a first waveform indicator indicating a selected waveform for transmitting the first message of the 2-step RACH request; and
         a second waveform indicator, different than the first waveform indicator, indicating a selected waveform for transmitting the at least one subsequent UL transmission of the 2-step RACH request; and
      a 4-step RACH request including a third message (msg3), and at least one subsequent UL transmission, and wherein
         the third message (msg3) of the 4-step RACH request includes a waveform indicator indicating a selected waveform for transmitting the at least one subsequent UL transmission of the 4-step RACH request.

2. The method of claim 1 further comprising:
   receiving, by the UE via the one or more antennas and a receive processor, at least one transmission;
   measuring, by the UE, a path loss based at least on the at least one transmission; and
   performing the selecting of the waveform at least on the measured path loss.

3. The method of claim 1 further comprising:
   identifying, by the UE, that the UE is preconfigured to send RACH requests or autonomous uplink (UL) transmissions according to DFT-S-OFDM; and
   performing the selecting based at least on the preconfiguration.

4. The method of claim 1 further comprising:
   identifying, by the UE, that the UE is preconfigured to send RACH requests or autonomous uplink (UL) transmissions according to CP-OFDM; and
   performing the selecting based at least on the preconfiguration.

5. The method of claim 1 wherein the UE determines the time and frequency resources that correspond to the selected waveform based at least on information received from a base station.

6. The method of claim 1 wherein the first waveform indicator indicating a selected waveform for transmitting the first message is included in at least one of: a DMRS and a preamble plus.

7. The method of claim 1 wherein the UL transmission is an autonomous UL transmission.

8. The method of claim 7 wherein a control signal indicating the selected waveform is sent with the autonomous UL transmission.

9. A user equipment (UE) comprising:
   one or more processor that selects a waveform from one of:
      Discrete Fourier Transform-Spread-Orthogonal Frequency Division Multiplexing (DFT-S-OFDM) single-stream transmission waveform, and
      Cyclic Prefix Orthogonal Frequency Division Multiplexing (CP-OFDM) multi-stream transmission waveform;
   wherein the one or more processor further determines time and frequency resources that correspond to the selected waveform; and
   one or more transmitter that sends an uplink (UL) transmission, via one or more antenna, according to the selected waveform and the determined time and frequency resources, wherein the UL transmission is part of a Random Access Channel (RACH) request, wherein the RACH request is one of:
      a 2-step RACH request including a first message and at least one subsequent UL transmission, and wherein a data payload of the first message of the 2-step RACH request includes:
         a first waveform indicator indicating a selected waveform for transmitting the first message of the 2-step RACH request; and
         a second waveform indicator, different than the first waveform indicator, indicating a selected waveform for transmitting the at least one subsequent UL transmission of the 2-step RACH request; and
      a 4-step RACH request including a third message (msg3), and at least one subsequent UL transmission, and wherein
         the third message (msg3) of the 4-step RACH request includes a waveform indicator indicating a selected waveform for transmitting the at least one subsequent UL transmission of the 4-step RACH request.

10. The UE of claim 9 further comprising:
    one or more receiver that receives downlink (DL) transmissions, via one or more antenna, wherein the one or more processor further measures a path loss of one or more of the DL transmissions and selects the waveform based at least on the measured path loss.

11. The UE of claim 9 wherein the one or more processor further identifies that that the UE is preconfigured to send RACH requests or autonomous UL transmissions according to DFT-S-OFDM, and based at least on the preconfiguration and type of UL transmission, the one or more processor further selects the DFT-S-OFDM waveform.

12. The UE of claim 9 wherein the one or more processor further identifies that that the UE is preconfigured to send RACH requests or autonomous UL transmissions according to CP-OFDM, and based at least on the preconfiguration and type of UL transmission, the one or more processor further selects the CP-OFDM waveform.

13. The UE of claim 9 wherein the UE utilizes information received from a base station to determine the time and frequency resources that correspond to the selected waveform.

14. The UE of claim 9 wherein the first waveform indicator indicating a selected waveform for transmitting the first message is included in at least one of: a DMRS and a preamble plus.

15. The UE of claim 9 wherein the UL transmission is an autonomous UL transmission.

16. The UE of claim 15 wherein the one or more transmitter sends a control signal with the autonomous UL transmission indicating the selected waveform.

17. A non-transitory computer-readable medium having program code recorded thereon, which when executed on user equipment (UE) causes the UE to perform functions, the program code comprising:
  program code for selecting a waveform to use for Random Access Channel (RACH) requests or autonomous uplink (UL) transmissions;
  program code for receiving time and frequency resources from a base station,
  based on the received time and frequency resources, program code for determining which of the time and frequency resources correspond to a preconfigured waveform, wherein the preconfigured waveform is one of:
    Discrete Fourier Transform-Spread-Orthogonal Frequency Division Multiplexing (DFT-S-OFDM) single-stream transmission waveform, and
    Cyclic Prefix Orthogonal Frequency Division Multiplexing (CP-OFDM) multi-stream transmission waveform; and
  program code for sending an UL transmission, via one or more transmitter and one or more antenna, according to the selected waveform and a determined time and frequency resources that correspond thereto, wherein the UL transmission is part of a RACH request, wherein the RACH request is one of:
    a 2-step RACH request including a first message and at least one subsequent UL transmission, and wherein a data payload of the first message of the 2-step RACH request includes:
      a first waveform indicator indicating a selected waveform for transmitting the first message of the 2-step RACH request; and
      a second waveform indicator, different than the first waveform indicator, indicating a selected waveform for transmitting the at least one subsequent UL transmission of the 2-step RACH request; and
    a 4-step RACH request including a third message (msg3), and at least one subsequent UL transmission, and wherein
      the third message (msg3) of the 4-step RACH request includes a waveform indicator indicating a selected waveform for transmitting the at least one subsequent UL transmission of the 4-step RACH request.

18. The non-transitory computer-readable medium of claim 17 further comprising:
  program code for receiving one or more downlink (DL) transmissions via one or more antenna;
  program code for measuring, by the UE, a path loss of one or more of the DL transmissions; and
  program code for performing the selecting the waveform at least on the measured path loss.

19. The non-transitory computer-readable medium of claim 17 further comprising:
  program code for identifying that the UE is preconfigured to send RACH requests or autonomous UL transmissions according to DFT-S-OFDM; and
  program code for performing the selecting based at least on the preconfiguration.

20. The non-transitory computer-readable medium of claim 17 further comprising:
  program code for identifying, by the UE, that the UE is preconfigured to send RACH requests or autonomous UL transmissions according to DFT-S-OFDM; and
  program code for performing the selecting based at least on the preconfiguration.

21. The non-transitory computer-readable medium of claim 17 wherein the program code determines the time and frequency resources that correspond to the selected waveform based at least on information received from the base station.

22. The non-transitory computer-readable medium claim 17 wherein the first waveform indicator indicating a selected waveform for transmitting the first message is included in at least one of: a DMRS and a preamble plus.

23. The non-transitory computer-readable medium of claim 17 wherein the UL transmission is an autonomous UL transmission and a control signal indicating the selected waveform is sent with the autonomous UL transmission.

24. A user equipment (UE) comprising:
  means for selecting a waveform to use for RACH requests or autonomous uplink (UL) transmissions;
  means for receiving time and frequency resources from a base station,
  based on the received time and frequency resources, means for determining which of the time and frequency resources correspond to a preconfigured waveform, wherein the preconfigured waveform is one of:
    Discrete Fourier Transform-Spread-Orthogonal Frequency Division Multiplexing (DFT-S-OFDM) single-stream transmission waveform, and
    Cyclic Prefix Orthogonal Frequency Division Multiplexing (CP-OFDM) multi-stream transmission waveform; and
  means for sending an UL transmission, via one or more transmitter and one or more antenna, according to the selected waveform and a determined time and frequency resources that correspond thereto, wherein the UL transmission is part of a RACH request, wherein the RACH request is one of:
    a 2-step RACH request including a first message and at least one subsequent UL transmission, and wherein a data payload of the first message of the 2-step RACH request includes:
      a first waveform indicator indicating a selected waveform for transmitting the first message of the 2-step RACH request; and
      a second waveform indicator, different than the first waveform indicator, indicating a selected waveform for transmitting the at least one subsequent UL transmission of the 2-step RACH request; and
    a 4-step RACH request including a third message (msg3), and at least one subsequent UL transmission, and wherein
      the third message (msg3) of the 4-step RACH request includes a waveform indicator indicating a selected waveform for transmitting the at least one subsequent UL transmission of the 4-step RACH request.

\* \* \* \* \*